United States Patent
Bell et al.

[15] 3,666,770
[45] May 30, 1972

[54] PROCESS FOR PREPARING D-5,5-DIMETHYL-Δ²-THIAZOLINE-4-CARBOXYLIC DERIVATIVES

[72] Inventors: Malcolm R. Bell, East Greenbush; John A. Carlson, Bethlehem; Rudolf Oesterlin, East Greenbush, all of N.Y.

[73] Assignee: Sterling Drug Inc., New York, N.Y.

[22] Filed: Jan. 27, 1970

[21] Appl. No.: 6,281

[52] U.S. Cl..........................260/306.7, 260/239.1, 260/534, 260/561 A
[51] Int. Cl. ..........................................C07d 91/24
[58] Field of Search................................260/306.7

[56] References Cited

OTHER PUBLICATIONS

Michael A. Schwartz Chemical Abstracts Vol. 62 (1965) p. 12984

Per Finholt et al. Chemical Abstracts Vol. 62, (1965) p. 12984

*Primary Examiner*—Alex Mazel
*Assistant Examiner*—Jose Tovar
*Attorney*—Elmer J. Lawson, B. Woodrow Wyatt, Thomas L. Johnson, Robert K. Bair, William G. Webb and Roger T. Wolfe

[57] ABSTRACT

Optically active penicillin and its derivatives are cleaved with an acid catalyst, e.g. trifluoroacetic acid, to form D-5,5-dimethyl-Δ²-thizaoline-4-carboxylic acid derivatives useful as intermediates for the preparation of synthetic penicillin derivatives having the proper stereochemical requirements at the 2-position thereof.

4 Claims, No Drawings

PROCESS FOR PREPARING D-5,5-DIMETHYL-Δ²-THIAZOLINE-4-CARBOXYLIC DERIVATIVES

PROCESS

This invention relates to a process for preparing intermediates useful for the preparation of synthetic penicillin derivatives having various substituent groups at the 5- and 6-positions thereof. A method for the synthesis of penicillin and its derivatives using D-penicillamine as starting material has been devised by Professor John C. Sheehan and is described by Sheehan et al. at J. Am. Chem. Soc. 81, 3089 (1959) and in Sheehan, U.S. Patent 3,159,619, patented December 1, 1964. Thus a route to synthetic penicillin derivatives from penicillamine is available. Retention of bio-activity in the final product, however, requires the use of D-penicillamine in the Sheehan synthesis, since the L-form of the latter results in biologically inactive final products, and course racemic D,L-penicillamine affords material having only 50 percent of the activity of material prepared from the optically active D-form. Use of the racemic mixture therefore would necessitate a resolution either of the DL-penicillamine itself, or of the final product, and/or of some appropriate intermediate involved in the Sheehan synthesis. There is thus a great need for a method of preparing optically pure D-penicillamine or suitable derivatives thereof so as to obviate the need for such expensive and time consuming resolutions and so as to provide starting materials for synthetic penicillins having the proper stereochemical requirements at the 2-position thereof.

The present invention provides a convenient method for the preparation of optically pure D-5,5-dimethyl-Δ²-thiazoline-4-carboxylic acid, or esters or amides thereof, which in turn are readily convertible to D-penicillamine or amide derivatives thereof. The D-5,5-dimethyl-Δ²-thiazoline-4-carboxylic acid of D-penicillamine derivatives prepared according to the instant process are prepared from readily available penicillin derivatives, which themselves cannot be converted directly to other derivatives having the desired substitution at the 5- and/or 6-positions. More specifically the instant process comprises the acid catalyzed cleavage of penicillin derivatives having the formula I below to D-5,5-dimethyl-Δ²-thiazoline-4-carboxylic acid derivatives having the formula II as represented by the equation:

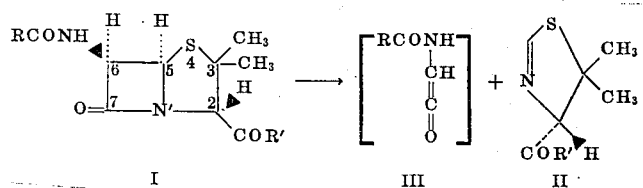

where R is lower-alkyl, phenyl, phenyl-lower-alkyl, or such phenyl or phenyl-lower-alkyl groups substituted in the phenyl ring by one or from two to three identical or different members of the group consisting of lower-alkyl, lower-alkoxy, nitro, amino, di-lower-alkylamino, lower-alkanoyl, cyano, halo (including fluoro, chloro, bromo, and iodo), hydroxy, trifluoromethyl, or lower-alkylmercapto; and R' is hydroxy (OH), lower-alkoxy, 2,2,2-trichloroethoxy ($OCH_2CCl_3$), amino ($NH_2$), or hydrozino ($NHNH_2$). The exact fate of the N-acylaminoglycyl fragment represented by formula III is not known, but is immaterial to the present invention, since under the conditions of the new process, it gives rise to further reaction products which do not interfere either with the course of the reaction or with the isolation of the desired thiazoline derivatives of formula II.

Preferred acid catalysts are di- and tri-fluoroacetic acids, and the process can be conducted at temperatures from around 15° C. to the boiling point of the acid catalyst used, i.e. 72° C. in the case of trifluoroacetic acid or 132° C. in the case of difluoroacetic acid. The process can either be carried out in the acid medium alone or, if desired, in the presence of the acid dissolved in a suitable solvent, such as acetic acid, either, dioxane, tetrahydrofuran, benzene, toluene, ethylene dichloride, methylene dichloride, or chloroform. It has been found that dilutions as low as five percent of the acid in the solvent can be used, but no particular advantage is gained by the use of such diluents, and in fact higher yields are obtained when the process is carried out in the acid medium alone.

The D-5,5-dimethyl-Δ²-thiazoline-4-carboxylic acid derivatives of formula II thus prepared can be hydrolyzed to a D-penicillamine derivative by heating the former with an aqueous solution of a strong acid, for example hydrochloric acid, sulfuric acid, hydrobromic acid, trifluoroacetic acid, and the like, as represented by the equation:

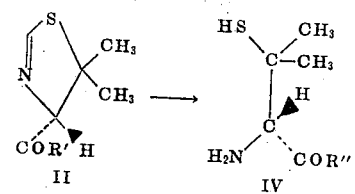

where R' has the meanings given above and R" represents hydroxy (OH), amino ($NH_2$), or hydrazino ($NHNH_2$). Under the conditions of the process, the starting thiazolines of formula II where R' is hydroxy, lower-alkoxy, or 2,2,2-trichloroethoxy (i.e. the free acid or lower-alkyl or 2,2,2-trichloroethyl esters) afford the free penicillamine itself where R" in the compounds of formula IV is hydroxy (OH). On the other hand, the thiazoline carboxylic acid amide or hydrazide (R' is $NH_2$ or $NHNH_2$, respectively) afford the corresponding penicillamide or -hydrazide of formula IV where R" is $NH_2$ or $NHNH_2$, respectively. Thus R" in the compounds of formula IV is hydroxy, amino, or hydrazino according to whether the thiazoline carboxylic acid, ester, amide, or hydrazide is used as starting material. The hydrolysis of the thiazoline derivatives with dilute mineral acid can take place at room temperature at prolonged reaction times, but reaction is expedited by heating the reaction mixture at the reflux temperature thereof. Thus it is preferred to carry out the hydrolysis at temperatures above room temperature, for example at the reflux temperature of the hydrolysis medium.

The penicillin derivatives of formula I where R' is hydroxy and R has the meanings given above are generally known. See, for example, Hobbs et al., U.S. Pat. No. 3,174,964, Kleinschmidt et al., U.S. Pat. No. 3,150,059, and Huang, U.S. Pat. No. 3,088,880 for representative alkylpenicillins where R is lower-alkyl; see Hobbs et al., U.S. Pat. No. 3,174,964, Doyle et al., U.S. Pat. No. 2,951,839, Doyle et al., U.S. Pat. No. 3,132,136, and Wolf et al., U.S. Pat. No. 3,331,834 for various phenylpenicillins where R is phenyl or substituted phenyl; and see Jansen et al., U.S. Pat. No. 2,880,203, Hobbs et al., U.S. Pat. No. 3,174,964, Huang, U.S. Pat. No. 3,088,880, and Kleinschmidt et al., U.S. Pat. No. 3,150,059 for various phenyl-lower-alkyl or substituted phenyl-lower-alkylpenicillins where R is phenyl-lower-alkyl or substituted phenyl-lower-alkyl.

The corresponding esters of formula I where R' is lower-alkoxy or 2,2,2-trichloroethoxy are conveniently prepared from the corresponding carboxylic acids by generally known procedures, for example by the method described by Jansen et al., U.S. Pat. No. 2,880,203 comprising reacting a penicillin triethyl ammonium salt or a sodium or potassium penicillinate with ethyl chloroformate in acetone or chloroform followed by reaction of the resulting mixed anhydride with an appropriate lower-alkanol or 2,2,2-trichloroethanol, as the case may be. The esters can also be prepared by reaction of a sodium or potassium penicillinate with a lower-alkyl halide in an organic solvent inert under the conditions of the reaction, for example dimethylformamide.

The amides or hydrazides of formula I where R' is $NH_2$ or $NHNH_2$, respectively, are also prepared from the corresponding carboxylic acids by generally known methods, for example by the method described by the above-noted Jansen et al., U.S. Pat. No. 2,880,203 comprising reaction of a mixed anhydride, prepared as described above, with ammonia to give the amide (R' is $NH_2$) or with hydrazine to give the corresponding hydrazide (R' is $NHNH_2$).

Alternatively the amides or hydrazides can be prepared from the corresponding acids by the method described by Godfrey, U.S. Pat. No. 3,301,811 which comprises reaction of the acid with a thionyl halide in an inert solvent such as methylene dichloride, and reaction of the resulting acid chloride with ammonia to prepare the corresponding amides (R' is $NH_2$) or with hydrazine to prepare the corresponding hydrazides (R' is $NHNH_2$).

As indicated above, the use of the free acids or the esters thereof in the practice of the present invention affords D-penicillamine (IV: R'' is OH). Because the isolation of the intermediate thiazoline derivative of formula III is facilitated when the esters, amides or hydrazides are used, the penicillins of formula I where R' is lower-alkoxy, 2,2,2-trichloroethoxy, amino, or hydrazino are preferred starting materials, and the esters are particularly preferred.

Moreover, although any of the penicillins defined by formula I, whether themselves derived by synthetic or by fermentation methods, are operative in the practice of the present invention, preferred starting materials are those obtained by fermentation methods and which are thus readily available and relatively inexpensive. Particularly preferred starting materials are benzylpenicillin lower-alkyl esters (penicillin G esters).

The identities of the D-5,5-dimethyl-$\Delta^2$-thiazoline-4-carboxylic acid and D-penicillamine derivatives prepared by the process of the instant invention were determined by the correspondence between the melting points, boiling points, and specific rotations of the products and known values for the compounds, and by the nuclear magnetic resonance spectra of the products. In fact the nmr spectra of the products of the acid catalyzed degradation in difluoroacetic or trifluoroacetic acid show signals characteristic of 5,5-dimethyl-$\Delta^2$-thiazoline-4-carboxylic acid at $\delta 1.3$-1.8 (singlet, 3); 1.7-2.0 (singlet, 3); 4.6-5.3 (doublet, 1, J = 2.0-2.5 Hz); and 8.7-9.7 ppm (doublet, 1, J = 2.0-2.5 Hz). [See Crooks, The Chemistry of Penicillin, Clarke et al., Eds., Princeton University Press, 1949, page 471]. Thus the determination of the nuclear magnetic resonance spectra of the thiazoline products affords a convenient method of following the course of the acid catalyzed degradation of the penicillin starting materials and of determining when the reaction has proceeded to completion.

The following examples will further illustrate the invention.

EXAMPLE 1

A suspension of 344 g. (0.09 mole) of potassium benzylpenicillinate (penicillin G potassium salt) in 2 liters of anhydrous dimethylformamide was stirred at room temperature under a nitrogen atmosphere for 6 hours with 59 ml. (0.9 mole) of methyl iodide. The clear solution was left under nitrogen at room temperature overnight and was then poured slowly into 6 liters of ice water with vigorous stirring. The white solid which separated was collected by filtration, washed with cold water, dissolved in 2.5 liters of methylene dichloride, and the solution washed first with cold water and then with saturated brine. The organic solution was dried over anhydrous sodium sulfate, filtered, and the filtrate evaporated to dryness at 40° C. The residual oil, on trituration with about 1 liter of absolute ether, solidified and was filtered and dried to give 250 g. of penicillin G methyl ester, m.p. 95°–96.5° C. Concentration of the filtrate gave 21 g. of a second crop of product, m.p. 94°–95° C.

The penicillin G methyl ester thus obtained (150 g., 0.43 mole) was added to 1.5 liters of trifluoroacetic acid, and the solution was heated on a steam bath under a nitrogen atmosphere for twenty minutes. The excess trifluoroacetic acid was then removed by evaporation in vacuo using a water aspirator while maintaining the pot temperature at or below 40° C. The residual yellow oil was dissolved in 1.5 liters of methylene dichloride, and the organic solution was added slowly over a period of about one hour to a vigorously stirred solution of 600 ml. of concentrated ammonium hydroxide in 3 liters of ice water while cooling the reaction mixture with an external ice bath. The organic phase was separated, the aqueous phase was extracted with chloroform, and the combined organic extracts were washed once with water, once with brine, dried over sodium sulfate, and taken to dryness to give a residual brown gum which was distilled in vacuo. There was thus obtained 43 g. of methyl D-5,5-dimethyl-$\Delta^2$-thiazoline-4-carboxylate, b.p. 74° C./0.3 mm; m.p. 50.5°–51.5° C.; $[\alpha]_D^{25}$ +51.9° C. (C 1, $CHCl_3$).

The NMR spectrum of a 20 percent solution of the above methyl D-5,5-dimethyl-$\Delta^2$-thiazoline-4-carboxylate in deuterochloroform showed signals at $\delta 1.35$ (singlet, 3), 1.73 (singlet, 3), 3.79 (singlet, 3), 4.63 (doublet, 1, J = 2.5 Hz), and 8.7 ppm (doublet, 1, J = 2.5 Hz), while the nmr spectrum of the same compound in trifluoroacetic acid solution showed signals at $\delta 1.6$ (singlet, 3), 1.92 (singlet, 3), 3.92 (singlet, 3), 5.13 (doublet, 1, J = 2.5 Hz), and 9.5 ppm (doublet, 1, J = 2.5 Hz).

The reaction of penicillin G methyl ester with trifluoroacetic acid was repeated by heating, on a steam bath for fifteen minutes, a solution of 1 g. of penicillin G methyl ester in 2 ml. of trifluoroacetic acid. Without isolating the D-5,5-dimethyl-$\Delta^2$-thiazoline-4-carboxylic acid methyl ester, the NMR spectrum was taken directly on the reaction mixture in order to determine whether the reaction had gone to completion. The NMR spectrum so obtained was virtually indistinguishable from that obtained above on pure methyl D-5,5-dimethyl-$\Delta^2$-thiazoline-4-carboxylate in trifluoroacetic acid, and exhibited the characteristic signals of the product, as indicated above, at $\delta 1.57$ (singlet, 3), 1.87 (singlet, 3), 3.92 (singlet, 3), 5.15 (doublet, 1, J = 2.5 Hz), and 9.5 ppm (doublet, 1, J = 2.5 Hz).

A solution of 2 g. (0.012 mole) of methyl D-5,5-dimethyl-$\Delta^2$-thiazoline-4-carboxylate in 21 ml. of 2.5N hydrochloric acid and 11 ml. of water was heated under reflux with stirring under a nitrogen atmosphere for 16 hours, and the resulting clear colorless solution was evaporated to dryness on a rotary evaporator. The residual gum was freed of traces of moisture by azeotropic distillation two times with an isopropanol/toluene mixture and once with benzene. The resulting white amorphous solid crystallized on trituration with diethyl ether, and it was collected by filtration and recrystallized, with seeding, from acetonitrile. There was thus obtained 1.3 g. of D-pencillamine hydrochloride which, on drying overnight at room temperature in a drying pistol at 0.01 mm., exhibited m.p. 177°–179.5° C. (dec.) (uncorr.); $[\alpha]^{25}$ −48.6° C. (C 1, 1N NaOH). [The Merck Index, 8th Ed., Merck & Co., Inc., Rahway, New Jersey, 1968, page 789 reports m.p. 177.5° C., (dec.); $[\alpha]_D^{25}$ −55° (1N NaOH)].

The NMR spectrum of a 20 percent solution of the penicillamine hydrochloride in deuterium oxide showed signals at $\delta 2.05$ (singlet, 3), 2.15 (singlet, 3), 4.65 (singlet, 1), and 5.4 ppm (singlet, 5 exchangeable protons), thus further supporting the identity of the product obtained.

EXAMPLE 2

A solution of 10 g. of potassium benzylpenicillinate (penicillin G potassium salt) in 50 ml. of trifluoroacetic acid was heated on a steam bath under nitrogen for 15 minutes. The fact that the reaction had gone to completion to form D-5,5-dimethyl-$\Delta^2$-thiazolinecarboxylic acid was demonstrated by the nmr spectrum of the reaction mixture which showed signals at $\delta 1.8$ (singlet, 3), 2.05 (singlet, 3), 5.35 (doublet, 1, J = 2.0 Hz), and 9.7 ppm (doublet, 1, J = 2.0 Hz). In this case the signal from the carboxylic acid proton of the product was obscured by the signal from the corresponding proton of the trifluoroacetic acid solvent.

EXAMPLE 3

A sample of benzylpenicillin methyl ester (penicillin G methyl ester, 100 mg.) was dissolved in 0.35 ml. of acetic acid and 0.15 ml. of trifluoroacetic acid, and the solution was heated on a steam bath for thirty minutes. The fact that the reaction had gone to completion to give D-5,5-dimethyl-$\Delta^2$-thiazoline-4-carboxylic acid methyl ester was demonstrated by the nmr spectrum of the reaction mixture which showed signals at $\delta 3.88$ (singlet, 3), 5.2 (doublet, 1, J = 2.5 Hz), and 9.7 ppm (doublet, 1, J = 2.5 Hz). In this case the acetic acid used as a solvent obscured the expected signals from the methyl groups at the 5-position of the thiazoline product.

EXAMPLE 4

A sample of 200 mg. of benzylpenicillin methyl ester (penicillin G methyl ester) was dissolved in 500 mg. of difluoroacetic acid, and the reaction mixture was heated on a steam bath for 2½ hours. The fact that the reaction had gone to completion to give D-5,5-dimethyl-$\Delta^2$-thiazoline-4-carboxylic acid methyl ester was shown by the NMR spectrum of the reaction mixture which exhibited signals at $\delta$ 1.5 (singlet, 3), 1.92 (singlet, 3), 4.0 (singlet, 3), and 9.7 ppm (doublet, 1, J = 2.0 Hz). In this case the difluoroacetic acid solvent obscured the expected signals from the 4-position of the thiazoline-4-carboxylic acid product.

EXAMPLE 5

A sample of 200 mg. of sodium 2,6-dimethoxyphenyl-penicillinate (sodium methicillin) was dissolved in 1 ml. of trifluoroacetic acid, and the mixture was heated under reflux for 35 minutes. The fact that the reaction had gone to completion to give D-5,5-dimethyl-$\Delta^2$-thiazoline-4-carboxylic acid was demonstrated by the NMR spectrum of the reaction mixture which showed signals at $\delta 1.75$ (singlet, 3), 2.0 (singlet, 3), 5.25 (doublet, 1, J = 2.0 Hz), and 9.6 ppm (doublet, 1, J = 2.0 Hz). In this case the trifluoroacetic acid obscured the carboxylic acid proton of the thiazoline 4-carboxylic acid product.

EXAMPLE 6

Reaction with difluoroacetic acid or trifluoroacetic acid of methylpenicillin, $\alpha,\alpha$-dimethylethylpenicillin, n-heptylpenicillin (penicillin K), phenylpenicillin, 3-methylphenylpenicillin, 4-methoxyphenylpenicillin, 4-nitrophenylpenicillin, 3,4,5-trimethoxyphenylpenicillin, 4-aminophenylpenicillin, 3-(dimethylamino)phenylpenicillin, 2-acetylphenylpenicillin, 4-cyanophenylpenicillin, 3,5-dichloro-4-hydroxyphenylpenicillin, 3-fluorophenylpenicillin, 3,4,5-triiodophenylpenicillin, 3-trifluoromethylphenylpenicillin, 4-chlorophenylpenicillin, 2-chlorophenylpenicillin, 4-hydroxyphenylpenicillin, 2,4,6-tribromophenylpenicillin, 4-hydroxybenzylpenicillin (penicillin X), 4-phenylbutylpenicillin, 2-nitrobenzylpenicillin, 3,4-dimethoxybenzylpenicillin, 2-methoxybenzylpenicillin, 4-methylbenzylpenicillin, 3,4-dichlorobenzylpenicillin, 2,4-dichlorobenzylpenicillin, 4-methylmercaptobenzylpenicillin, or 4-cyanobenzylpenicillin, or the corresponding lower-alkyl or 2,2,2-trichloroethyl esters thereof, which are prepared from the corresponding alkali metal salts according to the procedure described above in Example 1, and hydrolysis with dilute hydrochloric acid of the resulting D-5,5-dimethyl-$\Delta^2$-thiazoline-4-carboxylic acid (or lower-alkyl or 2,2,2-trichloroethyl ester) with dilute hydrochloric acid, all according to the procedure described above in Example 1, affords D-penicillamine hydrochloride.

EXAMPLE 7

Reaction of the penicillins listed above in Example 6 with thionyl chloride in methylene dichloride, and reaction of the resulting acid chlorides with ammonia or hydrazine affords the corresponding penicillamides or penicillin hydrazides. The latter, on reaction with difluoroacetic acid or trifluoroacetic acid according to the procedure described above in Example 1, affords D-5,5-dimethyl-$\Delta^2$-thiazoline-4-carboxylic acid amide or hydrazide as the case may be. The latter, on hydrolysis with dilute hydrochloric acid according to the procedure described above in Example 1, affords the amide or hydrazide of D-penicillamine.

We claim:
1. The process for preparing a D-5,5-dimethyl-$\Delta^2$-thiazoline-4-carboxylic acid derivative having the formula

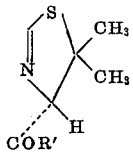

where R' is hydroxy (OH), lower-alkoxy, 2,2,2-trichloroethoxy, amino ($NH_2$), or hydrazino ($NHNH_2$) which comprises reacting in the presence of an acid catalyst selected from the group consisting of di- and tri-fluoroacetic acids a penicillin derivative having the formula

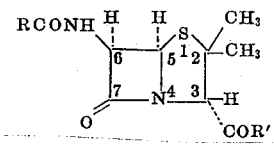

where R is lower-alkyl, phenyl, phenyl-lower-alkyl, or phenyl or phenyl-lower-alkyl substituted in the phenyl ring by one or two to three same or different members of the group consisting of lower-alkyl, lower-alkoxy, nitro, amino, di-lower-alkylamino, lower-alkanoyl, cyano, halo, hydroxy, trifluoromethyl, or lower-alkylmercapto; and R' has the meanings given above.

2. The process according to claim 1 for preparing a D-5,5dimethyl-$\Delta^2$-thiazoline-4-carboxylic acid lower-alkyl ester which comprises reacting with difluoroacetic acid or trifluoroacetic acid a penicillin derivative according to claim 1 wherein R' is lower-alkoxy.

3. The process according to claim 2 which comprises reacting with trifluoroacetic acid a phenyl-lower-alkylpenicillin lower-alkyl ester according to claim 2 where R is phenyl-lower-alkyl.

4. The process according to claim 3 for preparing D-5,5dimethyl-$\Delta^2$-thiazoline-4-carboxylic acid methyl ester which comprises reacting benzylpenicillin methyl ester with trifluoroacetic acid.

* * * * *

UNITED STATES PATENT AND TRADEMARK OFFICE
CERTIFICATE OF CORRECTION

PATENT NO. : 3,666,770
DATED : May 30, 1972
INVENTOR(S) : Malcolm R. Bell et al.

It is certified that error appears in the above-identified patent and that said Letters Patent are hereby corrected as shown below:

Column 1, line 1, Reads "PROCESS FOR PREPARING D-5,5-DIMETHYL-$\Delta^2$-THIAZOLINE-4-CARBOXYLIC DERIVATIVES" and should read --PROCESS FOR PREPARING D-5,5-DIMETHYL-$\Delta^2$-THIAZOLINE-4-CARBOXYLIC ACID DERIVATIVES--.

Column 1, line 4, Omit "Process".

Column 1, line 75, Change "either" to --ether--.

Signed and Sealed this

Tenth Day of October 1978

[SEAL]

Attest:

RUTH C. MASON
Attesting Officer

DONALD W. BANNER
Commissioner of Patents and Trademarks